Aug. 10, 1937.                    D. B. CAVE                    2,089,535
                          MIXING AND FILTERING APPARATUS
                              Filed May 1, 1935
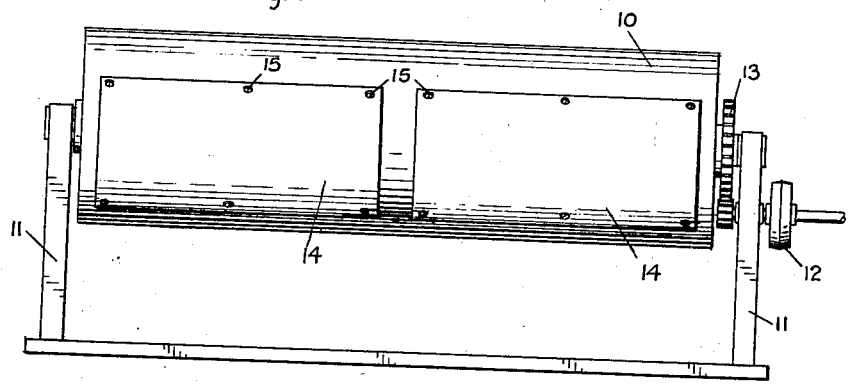
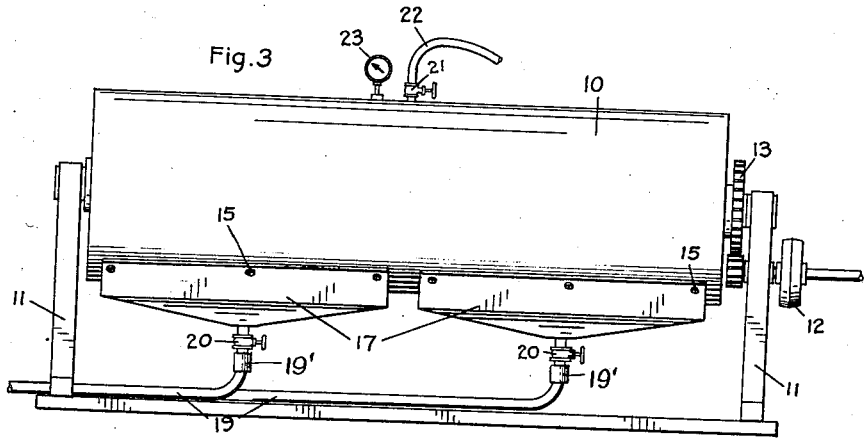
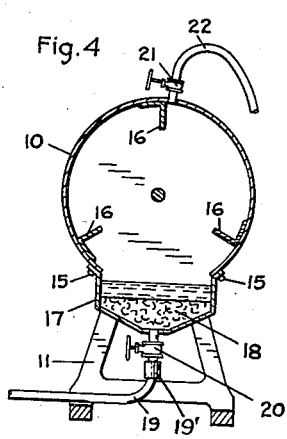
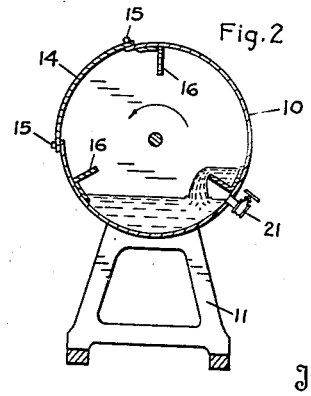
Inventor
D. B. Cave Patented Aug. 10, 1937

2,089,535

UNITED STATES PATENT OFFICE 2,089,535

MIXING AND FILTERING APPARATUS

Daniel B. Cave, Lincoln, Nebr., assignor to Ralph W. Ashton, Lincoln, Nebr.

Application May 1, 1935, Serial No. 19,255

1 Claim. (Cl. 210—180)

My invention relates to mixing and filtering apparatus having for its object the provision of apparatus for thoroughly mixing two or more substances one at least of which is a liquid, and then filtering the liquid and the solute from the same apparatus.

Another object of the invention is the provision of a rolling or slowly revolving drum having one or more openings for admitting materials together with a funnel and a closure plate which may be used interchangeably for closing the drum.

Another object of the invention is the provision of a drum having one or more funnels with filtering material together with means on the drum for applying air pressure so that the device will function as a filter press.

Another object of the invention is the provision of a slowly rotating or rolling drum having baffle plates for thoroughly mixing the contents of the drum.

Having in view these objects and others which will be pointed out in the following description, I will now refer to the drawing, in which Figure 1 is a view in side elevation of my device when used as a mixing apparatus.

Figure 2 is a view in transverse section showing the same device.

Figure 3 is a view in side elevation showing the device as it appears when used for filtering.

Figure 4 is a view in transverse section showing particularly the filtering device.

My invention includes a drum 10 which is mounted to rotate on its central axis in bearings in the supports 11 at both ends of the drum. A pulley 12 and gearing 13 with the power applied to the pulley 12 causes the drum to rotate slowly on its axis.

The drum is provided with one or more openings which are closed during the rotation of the drum by means of closure plates 14. These plates are bolted at 15 to the drum 10, the plates 14 having the curvature of the drum. At least one of these plates 14 is removed when it is desired to discharge material into the drum which may be done in any desired manner through the opening. The drum is also provided with a plurality of baffle plates 16, preferably three in number as shown in Figures 2 and 4. The material in the drum occupies the lowermost position as shown in Figure 2 and heavier portions of the material naturally seek the lowest level. The baffles 16 pass through this material and pick up the heavier portions and then discharge this picked up material in a manner shown in Figure 2 when the drum is rotating in the direction of the arrow. After each baffle passes its horizontal position the material is entirely discharged from that particular baffle but this discharge is such as to cause considerable agitation. It might be noted that the drum may be rotated in either direction of rotation without any loss in function.

When used as shown in Figure 2 the device is strictly a mixing mechanism but this may readily be converted into a filtering mechanism by removing the plate or plates 14 and substituting funnels 17 therefor. These funnels contain cocoa mat or other desired filter material 18 as shown in Figure 4. These funnels are associated with conduits 19 having valves 20 so that the filtered material may be carried away to a desired location. The drum is furthermore provided with a valved inlet 21 which may be connected through a conduit 22 with a source of compressed air for converting the device into a filter press.

The device is to be used primarily in the extraction of gold from its ore by means of the cyanide process. In this process the crushed ore is mixed with the weak solution of potassium cyanide in the presence of air. The gold in the ore is thus changed into a soluble gold cyanide.

In the use of the device at least one of the plates 14 is removed for conducting the mixture of ore and potassium cyanide solution into the drum. The plate 14 is then replaced and the drum is slowly rotated. As indicated in Figure 2 only a small portion of the interior of the drum is filled with the slime, the rest of the interior of the drum being filled with air. The splash produced by the action of the baffles 16 causes the mixture of the cyanide solution with the gold ore and of the air with the slime. This is continued until the action is sufficiently complete. The rotation of the drum is then stopped at a position such that the plates 14 will be above the level of the slime. These plates are removed and the funnels 17 are applied to cover the openings previously covered by the plates 14. The drum is then given a partial turn until the funnels 17 occupy the lowermost position as shown in Figure 4. The connections are then made with the conduit 19 and the valves 20 are then opened to permit the flow of the filtered material through the conduits. The connection may be of any of the of the well known releasable connections such as the elastic flexible tubes 19'. This flow is expedited through the filter press effect of the air pressure in the conduit 22, the valve 21 being opened to admit this air pressure. It is desirable that a certain control be maintained on the air pressure within the drum. Care should be taken that the pressure does not become great enough to rupture the drum or to release the connections between the funnels 17 and the drum. Furthermore, the pressure will naturally vary as part of the contents of the device are being carried away through the conduits 19. A perfect control over the pressure may be maintained through control of the valve 21 but it is also desirable to provide the drum with a gauge 23 for indicating to the operator the variations in pressure within the drum.

Having thus described my invention in such full, clear, and exact terms that its construction and operation will be readily understood by others skilled in the art to which it pertains, what I claim as new and desire to secure by Letters Patent of the United States is:

In combination, a horizontally positioned elongated drum having trunnions in the opposite extremities thereof whereby said drum may be either rotated or held against rotation, said drum being provided with a pair of horizontally aligning spaced apart rectangular openings in the cylindrical surface thereof, a pair of baffles projecting radially from the cylindrical wall thereof, said baffles being contiguous to the openings of the cylindrical wall of said drum, a pair of funnels positioned underneath said drum and having stationary valved conduits for the discharge of the contents of said drum to a remote position, means for releasably securing said funnels to said drum to close the openings thereof when said drum is stationary, a valve projecting outwardly from said drum and adapted for releasable connection with a gas pressure conduit, said valve being positioned diametrically opposite the openings in said drum and in the transverse plane of said drum intermediate said funnels whereby said funnels when disconnected from said drum will clear said valve when said drum is being rotated.

DANIEL B. CAVE.